United States Patent
Maya et al.

[11] Patent Number: 6,064,155
[45] Date of Patent: May 16, 2000

[54] COMPACT FLUORESCENT LAMP AS A RETROFIT FOR AN INCANDESCENT LAMP

[75] Inventors: Jakob Maya, Brookline; Edward K. Shapiro, Lexington; Frank D. Mellen, Boston, all of Mass.

[73] Assignee: Matsushita Electric Works Research and Development Labratory Inc, Woburn, Mass.

[21] Appl. No.: 09/072,100

[22] Filed: May 4, 1998

[51] Int. Cl.$^7$ .................................................. H01J 7/44
[52] U.S. Cl. ............................ 315/56; 315/634; 313/634; 313/318.01; 313/493; 362/362
[58] Field of Search ................................ 315/245, 56, 58, 315/61; 313/493, 573, 634, 318.09; 362/362

[56] References Cited

U.S. PATENT DOCUMENTS

| | | | |
|---|---|---|---|
| 4,644,228 | 2/1987 | Nilssen | 315/242 |
| 4,647,817 | 3/1987 | Fahnrich et al. | 315/104 |
| 4,647,820 | 3/1987 | Chermin et al. | 315/245 |
| 4,871,944 | 10/1989 | Skwirut et al. | 315/56 |
| 5,251,118 | 10/1993 | Budnovitch et al. | 362/362 |
| 5,331,253 | 7/1994 | Counts | 315/209 |
| 5,341,068 | 8/1994 | Nerone | 315/219 |
| 5,341,086 | 8/1994 | Fukudome | 323/273 |
| 5,349,270 | 9/1994 | Roll et al. | 315/209 |
| 5,552,666 | 9/1996 | Shea et al. | 313/493 |
| 5,680,005 | 10/1997 | Soules et al. | 313/493 |
| 5,691,598 | 11/1997 | Belle et al. | 313/493 |
| 5,703,440 | 12/1997 | Kachmarik et al. | 315/56 |
| 5,705,883 | 1/1998 | Soules et al. | 313/318.09 |
| 5,719,465 | 2/1998 | Den Breeijen et al. | 313/490 |
| 5,796,208 | 8/1998 | Girach | 313/493 |

FOREIGN PATENT DOCUMENTS

| | | | |
|---|---|---|---|
| 4133077 A1 | 4/1993 | Germany | H01J 61/33 |
| 7-218539/29 | 5/1995 | Japan . | |
| WO 94/29895 | 12/1994 | WIPO | H01J 61/30 |

OTHER PUBLICATIONS

Daniel J. Cotter et al.; "Subminiature Fluorescent Lamps"; IEE/IAS Conference, Toronto, Canada; Oct., 1993; pp. 2266–2271.

Primary Examiner—Don Wong
Assistant Examiner—Tuyet Vo

[57] ABSTRACT

A compact fluorescent lamp is designed to imitate an incandescent lamp in size, shape and luminosity. The lamp includes a bulbous envelope (14) having an external shape of an incandescent lamp (10) on a standard Edison-type base (11) that enables it to be substituted for standard 60, 75 and 100 W incandescent lamps. A low-pressure fluorescent lamp (18) having a coiled tubular envelope with an outer diameter less than about 7 mm, an inner diameter between about 1 and 5 mm, and a length between about 50 and 100 cm is wound in a coil around the axis of the bulbous envelope (14) and is disposed within the bulbous envelope. The tubular envelope is formed of soft glass and has a fluorescent phosphor coating disposed on the inner surfaces. Electrodes (14) with external electrical contacts are disposed at each end of the envelope. A ballast (12) is disposed within the bulbous envelope. The ballast is electrically connected to the lamp (15), whereby to control current in the fluorescent lamp. A heat shield (17) is disposed between the lamp and the ballast to thermally isolate the lamp from the ballast, whereby heat from the lamp will not adversely affect the ballast.

4 Claims, 3 Drawing Sheets

FIG·1

COMPACT FLUORESCENT LAMP AS A RETROFIT FOR AN INCANDESCENT LAMP

BACKGROUND OF THE INVENTION

The present invention relates to fluorescent lamps, and more particularly compact fluorescent lamps (CFLs) which are generally used as replacements for incandescent lamps to produce energy savings and longer lamp life.

DESCRIPTION OF THE PRIOR ART

Compact fluorescent lamps found on the market today generally have done a fairly good job in reducing the amount of energy required to illuminate areas such as offices, homes, and other areas. Unfortunately, however, the majority of CFLs are too expensive, and/or too large, for incandescent replacement applications in the residential market. For example, typically the compact fluorescent lamps found on the market have had the tubes bent into various shapes to make them smaller. These tubes are generally 12–14 mm in diameter. To obtain 800 to 1700 lumens (which are the lumen equivalent of 60 and 100 watt incandescent lamps) a lamp volume is required which far exceeds the volume of an incandescent lamp envelope. The envelope of an incandescent lamp is about 60 mm in diameter and 110 mm in height, compared with a conventional compact fluorescent lamp which is about 80 mm by 140 mm. Therefore, in many table lamp applications at home or in down lighting situations, these envelopes tend to stick out and are not pleasing aesthetically. Furthermore, many of the lamps tend to be heavy when they are magnetically ballasted, that is, a ballast with a copper and iron core. On the other hand, recently introduced CFLs have used electronic ballasting which is lighter and occupies a smaller volume.

Several important considerations in introducing compact fluorescent lamps are to have high efficiency, long life and low cost. Furthermore, the size and weight have to be approximately the same as, or comparable to, incandescent lamps. These are major objectives which are often very difficult to meet in practical applications. However, finding a solution for these objections opens the entire residential market, which is globally more than 6 billion incandescent lamps.

Reducing the size of the compact fluorescent lamp to expand its applicability has been pursued by lighting companies worldwide. One of the issues making it difficult to achieve this goal is the lamp has to operate in both hot and cold fixtures. Cold temperatures can be as low as −20° C. and the highest temperatures could be as much as +40 or +50° C. In cold temperatures the mercury pressure tends to be very low and, therefore, starting the lamp and getting light output is difficult and requires a variety of technical solutions. On the other hand, when the fixtures are hot the mercury pressure can be very high, leading to a substantial amount of resonance absorption and, as a result, lower efficiency.

These problems have been solved in the past by various techniques. For the low temperature, one of the techniques used is placing a flag containing Hg/In amalgam next to the electrode so radiating heat from the coil, after the power is turned on, is sufficient to release the Hg and initiate the discharge. Such flags can be found in a variety of compact fluorescent lamps.

The high temperature solution has, traditionally, used another amalgam which is composed typically of indium, bismuth, mercury, or indium, bismuth-mercury and some other metal, whereby the mercury vapor pressure is suppressed for ambient temperatures about +25° C. to +100° C., the vapor pressure of mercury is essentially the same. These techniques have been successfully employed in a variety of compact fluorescent lamps.

It is important to note, as the size of a CFL is reduced a phosphor wall loading (that is, the power divided into the surface area of the phosphor) phenomenon occurs. Therefore, for the same amount of power, the loading increases as compactness increases. High phosphor wall loading has a detrimental effect on the phosphor maintenance and, therefore, on the life of the compact fluorescent lamp. As the phosphor loading increases, color centers and other detrimental combination mechanisms lead to increased deterioration of the phosphor and results in poor light output later in life, therefore, diminishing the life expectancy of the lamp. Thus, it is important to ensure the phosphor loading does not exceed certain physical parameters, and/or the phosphor is protected appropriately, so the detrimental mechanisms leading to phosphor deterioration do not take place in a short period of time.

One of the major savings of the CFL, from a customer's point of view, is one does not have to change the lamp as frequently. Typically, incandescent lamps last 750 hours, whereas the compact fluorescent lamps last between 7500 and 10,000 hours. For any facility using as many as 1000 light sources, for instance an industrial/commercial facility, less labor is required in changing the lamps, providing significant economic savings in addition to the energy savings. The energy savings, typically, are substantial for a 1500–1700 lumen light source, the equivalent of a 100 watt incandescent lamp. The same amount of light can be obtained with about 25–28 watts from a compact fluorescent lamp. Similarly, 800 lumens (which is produced by a 60 watt incandescent lamp) can be obtained with a 13 watt compact fluorescent lamp. Therefore, when these numbers are multiplied by several hundred light sources per installation, the energy savings are dramatic.

SUMMARY OF THE INVENTION

An object of this invention is to provide a CFL which is no bigger than an incandescent light source, i.e., about 60 mm in diameter by 110 mm in height, and with a bulbous envelope that is necked-down to fit into a standard Edison-type base. Our lamp will deliver up to 1500–1700 lumens, which is an equivalent amount of light for an incandescent light source of 100 W. Our lamp utilizes several new technologies and the assembly of a whole package, so the lamp can be manufactured fairly economically on high-speed equipment.

Another object of the present invention is to provide a compact fluorescent lamp which can be used in table lamps, without removing the harp, so the bottom contour of the envelope shape resembles the incandescent contour.

Another object of the present invention is to provide a compact fluorescent lamp which can be manufactured from currently available components and standard technologies.

A further object of the present invention is to provide a compact fluorescent lamp which could be mass manufactured in high-speed equipment and made economically.

Another object of the present invention is to provide a compact fluorescent lamp no larger than an incandescent lamp for all three different lumen values which are most popularly used in the incandescent illumination field (800, 1200, and 1500–1700 lumens, or 60 W, 75 W and 100 W incandescent lamps).

A further object of the present invention is to provide a CFL with aesthetic appearance and uniform light distribution in all directions, very similar to an incandescent lamp.

Still another object of the present invention is to provide a CFL that can be dimmed using regular wall dimmers utilized for incandescent lamps in the residential market.

We have found the above objects can be accomplished by reducing the inner diameter of a standard fluorescent tube to between about 1 to 5 mm. As the diameter of the arc tube is reduced, however, the length of the arc has to be increased to provide the correct amount of light and the right amount of phosphor surface area so the phosphor deterioration mechanisms, mentioned above, do not take place and therefore the life and the maintenance of the lamp is not compromised.

Therefore, according to our invention, we provide a compact fluorescent lamp which utilizes glass tubing with an outside diameter of no more than about 7 mm and an inside diameter between about 1 to 5 mm. The tubing is convoluted so the space occupied by the total lamp itself is no more than about 60 mm in diameter and less than about 110 mm in height. Furthermore, we utilize a miniaturized ballast so it can be disposed within the bulbous envelope and the contour of an incandescent lamp can be maintained, so the lamp looks identical in size and shape to an incandescent lamp. In this configuration, it is very important to recognize that the heat of the light source can adversely affect the functioning of the electronic ballast, especially in hot fixtures. Therefore, we have introduced a heat-deflecting surface between the light source and the ballast to shield the ballast from the light source heating and direct the heat downwardly to the base and through the fixture, as to prevent a very hot environment from damaging the electronic ballast.

This has been accomplished in a variety of ways which will be detailed in a later section. However, for a base-up operation in hot fixtures, we have found this design operates quite successfully and protects the housing of the ballast from getting too hot.

In particular, we have developed a compact fluorescent lamp with a bulbous envelope having a diameter less than about 60 mm and a height less than about 110 mm. A standard Edison-type base is disposed on the envelope. A tubular fluorescent lamp having a tubular envelope with an outer diameter less than about 7 mm, an inner diameter between about 1 and 5 mm, and a length (straight) between about 50 and 100 cm is disposed within the bulbous envelope. The tubular envelope is formed of a glass having a softening point below about 650° C., and has a conventional rare earth fluorescent phosphor coating disposed on the inner surface. Electrodes with external electrical contacts are disposed at each end. A ballast is disposed within the envelope, the ballast being electrically connected to the lamp, whereby to control the lamp. A shield is used to thermally isolate the lamp from the ballast, whereby heat from the lamp will not adversely affect the ballast. The lamp can be spirally wound in a coil, coiled in a double-coil helix shape, or bent into "U" shapes, so it can be fitted in the incandescent lamp envelope. Irrespective of the shape of the lamp, the ballast is separated from the lamp to provide for heat protection.

DESCRIPTION OF THE PREFERRED EMBODIMENTS

Figure 1:
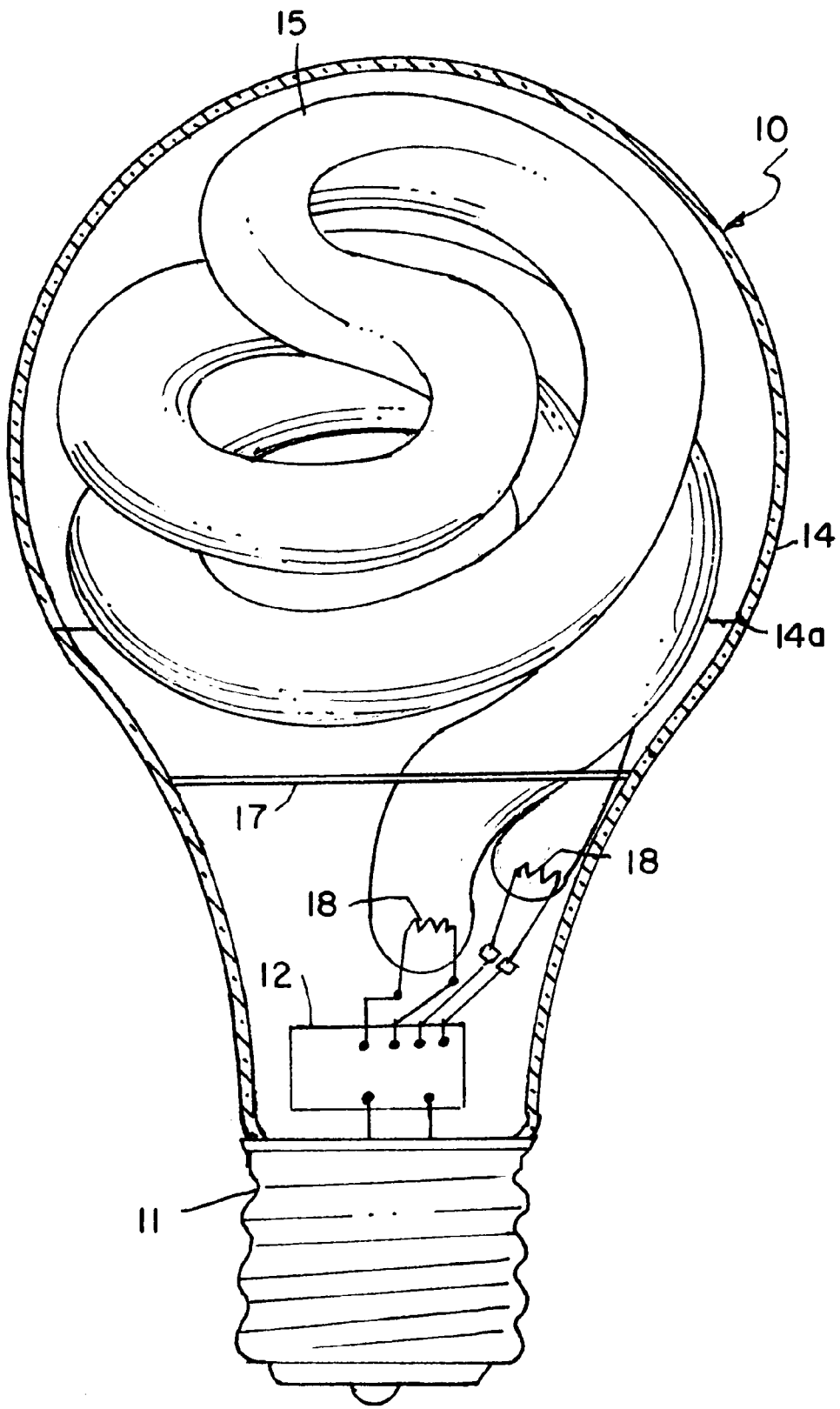
FIG. 1 is an elevational view, partially in cross section, showing one embodiment of the lamp of the present invention.

FIG. 1 shows a compact fluorescent lamp which includes a standard Edison-type screw base 11 adapted to be fitted in a standard socket. A bulbous envelope 14 is shaped as a replacement for a conventional incandescent lamp for use in a table lamp containing a harp. A small diameter fluorescent lamp 15 is coiled in a double spiral configuration and disposed inside of the bulbous envelope 14. The length of the lamp can be between 50 and 100 cm (straight), depending upon the desired luminosity. The straight tube used to make the illustrated double-coil lamp was 75 cm long. The outside diameter of the lamp was 7 mm and the inside diameter was 5 mm. The luminosity of this lamp is the equivalent of a 100 W incandescent lamp.

A conventional miniature electronic ballast 12 is connected to the electrodes 18 of the lamp 15. We have found that commercially available electronic ballasts, such as disclosed in the United States Patents to Nerone, U.S. Pat. No. 5,341,068, or to Hubertus et al., U.S. Pat. No. 4,647,820, can be disposed adjacent the base 11 and within the envelope 14. The electronic ballast 12 is protected from heat from the light source to prevent its destruction. Such protection can be provided with a shield 17 formed of aluminum sheet material adjacent the lamp 15 to reflect infrared radiation emitted by the lamp. Additionally, the aluminum shield 17 can be painted white or coated with alumina (not shown) to reflect visible radiation outwardly, thereby increasing the efficiency of the lamp. If desired, the shield 17 can be thermally connected to the base 11, whereby heat can be transferred to the fixture in which the lamp will be housed. Such connection can be provided by extending a metal wire or strap 9 from the shield 17 to the inside of the base 11. Other mechanisms for providing a thermal barrier between the ballast 12 and the lamp 15 include a Teflon or high-temperature plastic shield around the electronics with a dichroic infrared reflecting coating, so the infrared radiation is projected outwardly from the lamp and the inside of the lamp is protected from heat and high temperature hot spots.

The lamp 15 was assembled with hot cathodes 18 using procedures well-known to the fluorescent lamp manufacturing industry. Since the lamp of the present invention had to be coiled in an unusual configuration, the procedures for coating the phosphor within the envelope were studied. We have found that coating the envelope before it was bent was more easily accomplished than coating the envelope after it had been bent. The glass of the fluorescent lamp envelope 15 was first coated with phosphor using conventional techniques, and then softened with a flame and made into a double-coil arrangement, whereby both cathodes are at the bottom of the lamp. When coiling the envelope, the phosphor was protected and kept as cool as possible to avoid disintegration, dislodging or breaking off from the glass. The entire size of the double coil is about 50 mm in height and 50 mm in diameter. A substantial amount of room is left within the bulbous envelope to fit the electronic ballast.

We have found that a gas-fill pressure of about 5 torr of argon is best for lamp efficiency. The lamp can have an outside diameter between about 2 and 7 mm and an inside diameter between about 1 and 5 mm. The cathodes which are used in the lamp preferably have a linear or "V" shape. In most applications we have not found it necessary to use an amalgam for cold starting the lamps. However, if it is found necessary under certain conditions, a small flag may be attached to the lead wire of one of the electrodes. For hot fixtures, we have found, when using a diffusing envelope outside the fluorescent lamp, the temperatures were significantly higher than optimum and, as a result, we used an amalgam composed of indium, bismuth and mercury, as is conventional. The amalgam was quite useful in maintaining the efficiency of the lamp in a hot fixture. In lamps which were operating at 40–50° C., the light output was within about 90% of the optimum.

To coil the lamp, we have tried several different approaches. In one approach, the lamp was heated to the softening point of the glass. The center of the lamp was grasped with a mandrel which was slowly rotated to cause the softened glass to wrap around the mandrel. In another approach, the lamp was heated to softening point and grasped with a hook and rotated to make a single coil. In yet another approach, the straight tube was bent into a "U" shape and then the two arms of the "U" were simultaneously coiled.

Base 11 is attached to bulbous envelope 14 in a conventional manner, well-known to the incandescent lamp industry. To enable one to place the fluorescent lamp 15 and the ballasting within the bulbous envelope, the envelope is cut midway at seam 14a and then resealed after placement of the fluorescent lamp 15. While conventional glass is preferable for the bulbous envelope, other materials can be used, such as clear plastics which are not affected by ultraviolet radiation. As stated above, to increase the overall efficiency of the lamp and protect the ballast, the bottom part of the envelope 14 closest to the metal Edison base can be coated with a white reflecting material (not shown), such as paint or aluminum oxide, to reflect light that would otherwise be lost in the socket and base.

The above-mentioned ballast fits within the lamp envelope and provides the necessary control. Typical electrical parameters obtained with lamps are around 250 volts for lamp voltage and about 80–150 milliamps, with about 80–100 milliamps being the optimum for producing about 1500–1700 lumens in the lamp. The color rendition index (CRI) and the color temperature of the lamp can be adjusted by changing the phosphor composition. In the present lamps standard rare earth phosphors were used.

Figure 2:
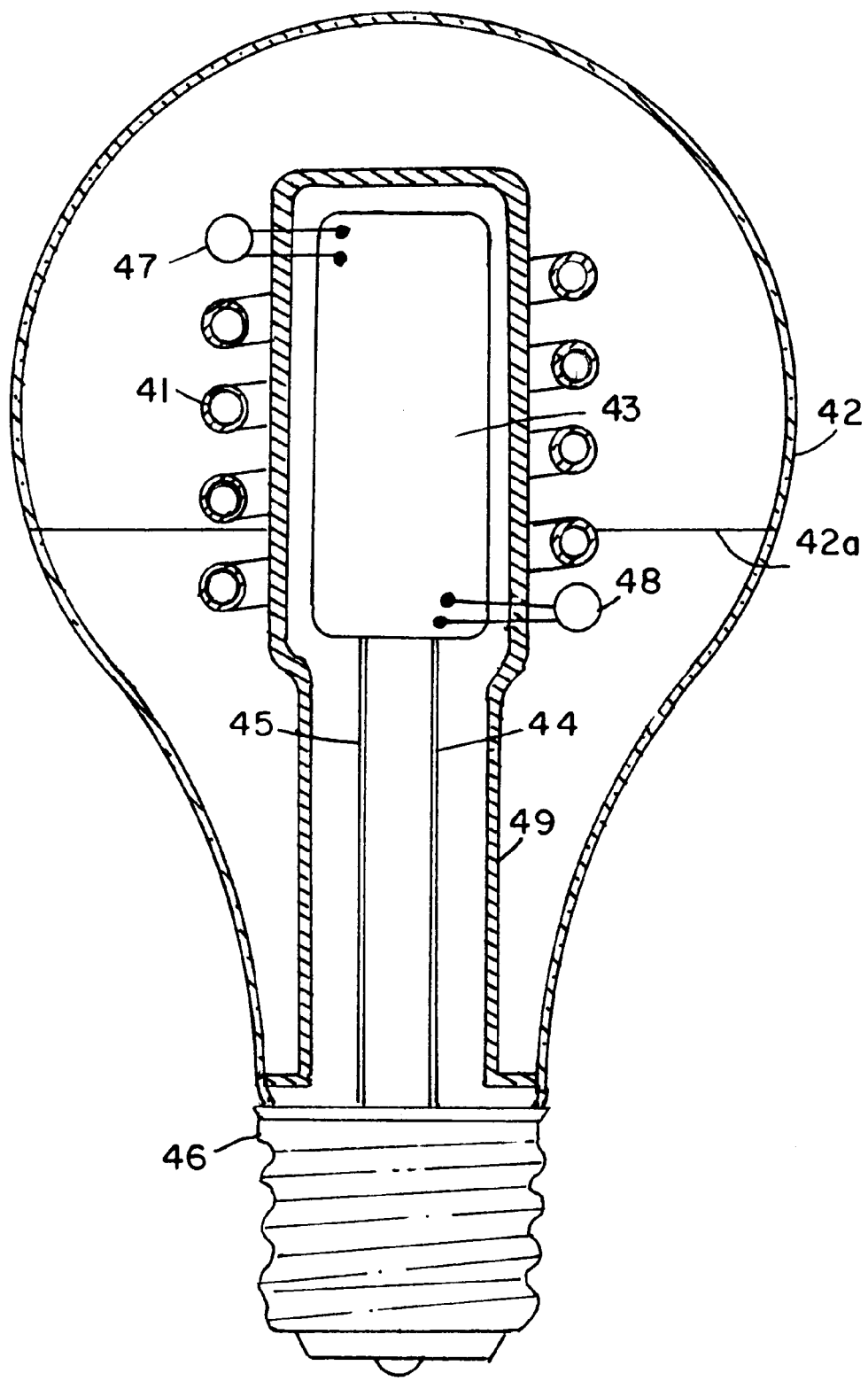
FIG. 2 is an elevational view, partially in cross section, showing another embodiment of the lamp of the present invention.

Referring to FIG. 2, a variation of the lamp shown in FIG. 1 is provided. A single coiled fluorescent lamp 41 is disposed around the axis of the lamp and within a bulbous envelope 42. A conventional ballast 43 is centrally disposed within the bulbous envelope 42, and is supported by lead-in wires 44 and 45 which are connected to base 46. Cathodes within the ends of the lamp 47 and 48 are connected to the ballast 43. An aluminum heat-transfer shield 49 is disposed about the ballast 43, and preferably is coated with a high-reflectivity paint (not shown). A seam 42a is provided in the bulbous envelope 42 to enable the fluorescent lamp and ballast to be mounted therein.

Figure 3:
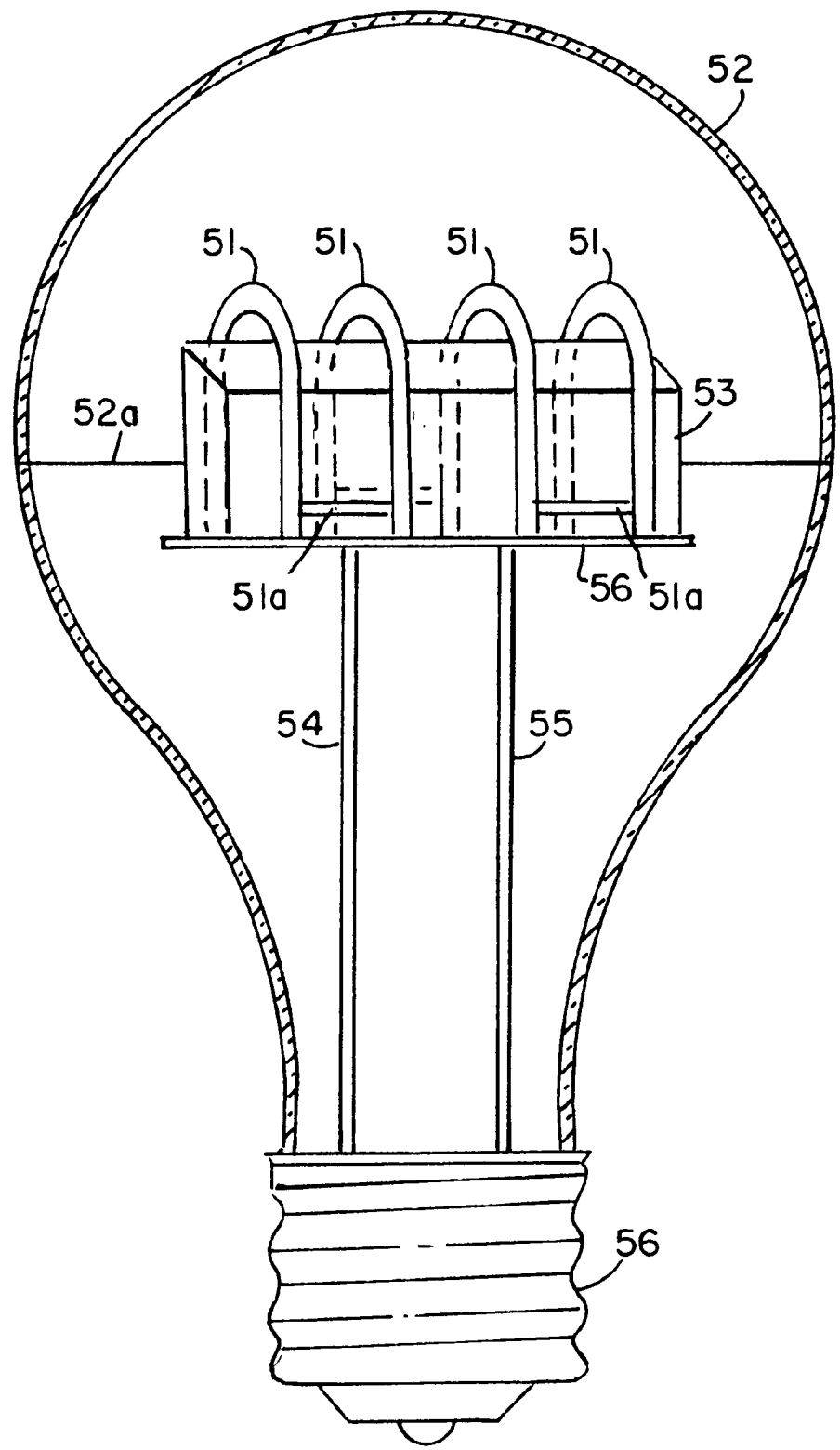
FIG. 3 is an elevational view, partially in cross section, showing a further embodiment of the lamp of the present invention.

Referring to FIG. 3, another variation of the lamp shown in FIG. 1 is provided. Several U-shaped tubes are joined together with tubes 51a to form a single fluorescent lamp 51. A cathode is disposed at one end of the first segment and another at an end of the last segment. The assembly is disposed within a bulbous envelope 52. A conventional electronic ballast covered in a shield 53 is centrally disposed within the bulbous envelope 52, and is supported by aluminum tubes 54 and 55 which are connected to an Edison-type base 56. Shield 56 also supports the lamp convolutions 53a–51d. The tubes 54 and 55 also support a heat-transfer shield 56 and serve to transfer heat from the shield 56 to the base 57. They also house wires leading to the ballast 53. A cathode is disposed at each end of the lamp and is connected by wires to the ballast 53. The heat-transfer shield disposed about the ballast 56 preferably is coated with a high-reflectivity paint. A seam 52a is provided in the bulbous envelope 52 to enable the fluorescent lamp and ballast to be mounted therein. Each of the lamp segments was 7 mm in diameter, and the total length of the four lamps was 70 mm (measured straight).

It is apparent that modifications and changes can be made within the scope of the present invention, but it is our intention only to be limited by the scope of the following claims.

As our invention we claim:

1. A compact fluorescent lamp comprising:

a bulbous envelope having an external shape of an incandescent lamp, said bulbous envelope having a diameter less than about 60 mm, a height less than about 110 mm and a necked-down portion adjacent said base and a standard Edison-type base disposed thereon, said base being adapted to fit in a standard socket in an incandescent lamp fixture; and a low-pressure fluorescent lamp comprising at least one tube, said tube having an outer diameter less than about 7 mm, an inner diameter between about 1 and 5 mm and a total length of said tube being between about 50 and 100 cm, said tube being disposed within said bulbous envelope, said tubular envelope being formed of soft glass and having a fluorescent phosphor coating disposed on the inner surfaces thereof and electrodes with external electrical contacts disposed at each end thereof;

a ballast disposed within said bulbous envelope, said ballast being electrically connected to said fluorescent lamp whereby to control current in said lamp; and means to thermally isolate said fluorescent lamp from said ballast whereby heat from said lamp will not adversely affect said ballast, said means including a heat shield disposed between said fluorescent lamp and said ballast to thermally isolate said fluorescent lamp from said ballast, said means further including and a heat reflecting coating and a light reflecting coating on said heat shield, whereby heat from said fluorescent lamp will not adversely affect said ballast and light front said lamp will be reflected from said envelope.

2. The lamp according to claim 1 wherein there are a plurality of U-shaped tubes joined together to form a lamp and said thermal isolation means is a plate, said tubes being disposed on said plate.

3. The lamp according to claim 1 wherein said tube is spirally disposed around said thermal isolation means and said ballast is disposed therein.

4. The lamp according to claim 1 wherein said bulbous envelope is divided in two sections whereby to enable said fluorescent lamp to be fitted within said bulbous envelope and means to join said two sections of said envelope together.

* * * * *